United States Patent Office 2,740,790
Patented Apr. 3, 1956

2,740,790

2-THIO-3,3-DIHYDROCARBON 4 - OXO - TETRAHYDRO PYRIDINES AND PREPARATION THEREOF

August Hans Lutz, Basel, Switzerland, assignor to Hoffmann-La Roche Inc., Nutley, N. J., a corporation of New Jersey No Drawing. Application November 18, 1953, Serial No. 392,998

Claims priority, application Switzerland December 4, 1952

8 Claims. (Cl. 260—294.8)

The present invention concerns sulfur containing pyridones of the general formula

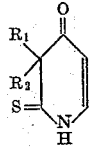

wherein $R_1$ and $R_2$ stand for hydrocarbon radicals containing 1–4 carbon atoms more particularly lower alkyl and alkenyl radicals, such as methyl, ethyl, propyl, butyl, vinyl, allyl groups. These sulfur containing pyridones are characterized by a strong, but only short hypnotic action. Especially valuable is 2-thio-3-methyl-3-ethyl-4-oxo-1,2,3,4-tetrahydropyridine.

The novel compounds of the above formula are of pale yellow coloration, they are only difficultly soluble in water, but easily soluble in the usual organic solvents, such as alcohol, ether, benzene, dioxan. They are also soluble in aqueous alkaline solutions, the color becoming darker, and may be precipitated therefrom by means of acids, the color getting lighter again.

The invention provides also a process for the manufacture of the above sulfur containing pyridones, which process comprises condensing an α,α-dihydrocarbyl-acetacetonitrile with a formic acid ester in the presence of an alkaline condensing agent to produce the corresponding γ-hydroxy-methylene compound, treating the latter with ammonia to form the γ-amino-methylene compound, cyclizing the same by means of an alkaline condensing agent and treating the cyclization product with hydrogen sulfide or a hydrogen sulfide producing agent.

The α,α-dihydrocarbyl-acetacetonitriles may be obtained by alkylation or alkenylation of the α-alkyl-acetacetonitriles described by E. Mohr (Journal für praktische Chemie (2), volume 57 [1907], page 549, and volume 90 [1914], page 189). The alkylation may be carried out with alkenyl or alkyl halides according to methods usually employed for the alkylation of α-alkyl-acetacetic esters. The α,α - dihydrocarbyl-γ-hydroxymethyleneacetacetonitriles are obtained preferably by reaction of the corresponding nitriles with a formic acid ester in an inert organic solvent, such as benzene, toluene or diethylcarbonate, in the presence of an alkaline condensing agent, such as sodium metal, potassium metal or sodium alcoholate.

The α,α-dihydrocarbyl-acetacetonitriles, which are difficultly soluble in water, do not form any salts with aqueous alkali solutions and may easily be separated from the α,α - dihydrocarbyl-γ-hydroxymethylene-acetacetonitriles formed, which themselves are easily soluble in aqueous alkali solutions. The latter may then be treated with ammonia and ammonium chloride to produce the α,α-dihydrocarbyl-γ-aminomethylene compounds, which are difficultly soluble in aqueous solution.

The α,α-dihydrocarbyl-γ-aminomethylene-acetacetonitriles, as obtained above, may be cyclized with alkaline condensing agents, for example alkali alcoholate, the cyclizing reaction being suitably conducted in an organic solvent, such as methanol. When reacting the cyclization product with hydrogen sulfide or with a hydrogen sulfide producing agent, such as phosphorus pentasulfide, then the desired 2-thio-3,3-dihydrocarbyl-4-oxo-1,2,3,4-tetrahydropyridines are obtained.

Example 1

To a solution of 23 parts by weight of sodium in 500 parts by volume of dry alcohol is added a mixture of 97 parts by weight of 2-cyanobutanone-3 (E. Mohr, Journal für praktische Chemie (2), volume 90 [1914], page 189 [boiling point₁₉ mm. 78° C.]) and 109 parts by weight of ethyl bromide and the mixture is stirred at 50° C. for 16 hours. The main part of the alcohol is distilled off, water is added to the residue and the α-ethyl-α-methyl-acetacetonitrile formed is separated. This oil, which is insoluble in alkalis, boils without being decomposed between 80 and 82° C./14 mm.

125 parts by weight of α-ethyl-α-methyl-acetacetonitrile and 90 parts by weight of formic acid methylester are added to a suspension of 24 parts by weight of sodium in 800 parts by volume of toluene and the mixture is stirred at 20° C. for 16 hours. The sodium salt of α-ethyl-α-methyl-γ-hydroxymethylene-acetacetonitrile formed is dissolved with water, separated and directly converted into the aminomethylene compound by the addition of ammonium chloride and ammonia. The α-ethyl-α-methyl-γ-aminomethylene-acetacetonitrile, which in diluted ammonia solution is difficultly soluble, is extracted with benzene; the benzene extract is then dried and evaporated in vacuo. The remaining oil may be purified by distillation in high vacuo (boiling point₀.₀₅ mm. 106° C.).

152 parts by weight of α-ethyl-α-methyl-γ-aminomethyleneacetacetonitrile are reacted with a sodium alcoholate solution, prepared from 30 parts by weight of sodium and 500 parts by volume of alcohol, and allowed to stand for 12 hours. Then 80 parts by weight of hydrogen sulfide are introduced, the solution becoming warm. Once the reaction is completed, 125 parts by volume of 37 per cent hydrochloric acid are added dropwise, hydrogen sulfide being thereby liberated. The dark colored reaction product is filtered through charcoal. Upon adding dropwise 500 parts by volume of water, the 2-thio-3-ethyl-3-methyl-4-oxo-1,2,3,4-tetrahydropyridine formed precipitates in yellow crystals. After a recrystallization from methanol, the crystals melt at 113–114° C.

Example 2

97 parts by weight of 2-cyanobutanone-3 are dissolved in 1000 parts by volume of 1 N sodium hydroxide solution, 0.1 part by weight of copper powder are added and, while stirring, the mixture is reacted with 121 parts by weight of allyl bromide. The α-allyl-α-methyl-acetacetonitrile, which is difficultly soluble in water, is separated off and distilled in vacuo. The boiling point of the colorless oil is 80–85° C./12 mm.

137 parts by weight of α-allyl-α-methyl-acetacetonitrile are dissolved in 600 parts by volume of methanol and shaken at room temperature with hydrogen under atmospheric pressure or under slightly elevated pressure in the presence of a catalyst, such as palladium charcoal. After 1 mol of hydrogen is absorbed, the hydrogenation is interrupted. After removal of the catalyst and of the solvent, the α-n-propyl-α-methyl-acetacetonitrile, which boils between 90 and 95° C./12 mm., is obtained.

139 parts by weight of α-n-propyl-α-methyl-acetacetonitrile are mixed with 90 parts by weight of formic acid ethylester and added dropwise at room temperature to a suspension of 24 parts by weight of sodium in 600 parts by weight of benzene. After 12 hours' stirring, the solution is extracted with 500 parts of water and the aqueous layer is separated. 60 parts by weight of ammonium chloride and 30 parts by volume of 25 per cent aqueous ammonia are added thereto, whereupon the mixture is stirred at 60° C. for 2 hours. The precipitated α-n-propyl-α-methyl-γ-aminomethylene-acetacetonitrile is extracted twice with 200 parts by volume of benzene and the extracts are concentrated in vacuo to dryness to yield the pure compound.

The 2-thio - 3 - n-propyl-3-methyl-4-oxo-1,2,3,4-tetrahydropyridine is prepared from the above compound in a manner analogous to that described in Example 1. The melting point of the product, after recrystallization from methanol, is 117–118° C.

The corresponding 2 - thio - 3 - allyl-3-methyl-4-oxo-1,2,3,4-tetrahydropyridine, which may be prepared according to the same procedure, is isolated as an oil.

*Example 3*

As described in Example 1, α-ethyl-acetacetonitrile (E. Mohr, Journal für praktische Chemie, (2), volume 75, [1907], page 549) is reacted with ethyl bromide in sodium alcoholate solution. The α,α-diethyl-acetacetonitrile formed boils at 100–102° C./14 mm.

The above α,α-diethyl-acetacetonitrile can be converted in the same manner as described in Example 1 into the α,α-diethyl-γ-aminomethylene-acetacetonitrile, which boils between 137 and 140° C./0.1 mm.

160 parts by weight of α,α-diethyl-γ-aminomethylene-acetacetonitrile are heated with a solution of 24 parts by weight of sodium in 500 parts by volume of absolute alcohol, whereupon 50 parts by weight of hydrogen sulfide are introduced. After working up according to Example 1, 2-thio-3,3-diethyl-4-oxo-1,2,3,4-tetrahydropyridine is obtained in the form of yellow crystals of melting point 141–142° C.

I claim:

1. A compound selected from the group consisting of 2-thio-3,3-dihydrocarbyl - 4 - oxo-1,2,3,4-tetrahydropyridines, the ammonium and alkali metal salts thereof; said hydrocarbyl being a monovalent acyclic hydrocarbon radical containing from 1 to 4 carbon atoms.

2. A 2-thio-3,3-di(lower alkyl)-4-oxo-1,2,3,4-tetrahydropyridine.

3. A 2-thio-3(lower alkyl)-3-lower alkenyl-4-oxo-1,2,3,4-tetrahydropyridine.

4. 2-thio-3-methyl - 3 - ethyl-4-oxo-1,2,3,4-tetrahydropyridine.

5. A process which comprises condensing an α,α-dihydorcarbyl-acetacetonitrile with a lower formic acid ester in the presence of an alkaline condensing agent to produce the corresponding α,α-dihydrocarbyl-γ-hydroxymethylene-acetacetonitrile, treating the latter with ammonia to form α,α - dihydrocarbyl - γ - aminomethylene-acetacetonitrile, cyclizing the same by means of an alkaline condensing agent and treating the cyclization product with a compound selected from a group consisting of hydrogen sulfide and a hydrogen sulfide producing agent, to produce a 2-thio-3,3-dihydrocarbyl-4-oxo-1,2,3,4 - tetrahydropyridine; said hydrocarbyl being a monovalent acyclic hydrocarbon radical containing from 1 to 4 carbon atoms.

6. The process of claim 5, wherein the hydrocarbyl radicals are lower alkyl groups.

7. The process of claim 5, wherein one of the hydrocarbyl radicals is a lower alkenyl group and the other is a lower alkyl group.

8. A process which comprises treating an α,α-di(lower alkyl)-γ-aminomethylene-acetacetonitrile first with a solution of an alkaline condensing agent, then with hydrogen sulfide, so as to form a solution of a 2-thio-3,3-di(lower alkyl)-4-oxo-1,2,3,4-tetrahydropyridine salt.

References Cited in the file of this patent

UNITED STATES PATENTS

| | | |
|---|---|---|
| 1,753,658 | Kochendoerfer | Apr. 8, 1930 |
| 2,686,786 | Shaw | Aug. 17, 1954 |
| 2,702,293 | Hoffmann | Feb. 15, 1955 |